United States Patent
Ehmer et al.

(10) Patent No.: US 6,203,122 B1
(45) Date of Patent: Mar. 20, 2001

(54) ELECTRONIC BRAKING-FORCE-DISTRIBUTION METHOD

(75) Inventors: Norbert Ehmer, Eschborn; Thomas Pröger, Rödermark; Markus Zenzen, Hattersheim, all of (DE)

(73) Assignee: Continental Teves AG & Co. OHG (DE)

(*) Notice: Subject to any disclaimer, the term of this patent is extended or adjusted under 35 U.S.C. 154(b) by 0 days.

(21) Appl. No.: 09/194,278

(22) PCT Filed: May 20, 1997

(86) PCT No.: PCT/EP97/02559

§ 371 Date: Jul. 9, 1999

§ 102(e) Date: Jul. 9, 1999

(87) PCT Pub. No.: WO97/44223

PCT Pub. Date: Nov. 27, 1997

(30) Foreign Application Priority Data

May 22, 1996 (DE) .............................................. 196 20 583

(51) Int. Cl.$^7$ ................................ B60T 8/60; B60T 8/32; B60T 8/26

(52) U.S. Cl. .................. 303/186; 188/369; 303/122.05; 303/122.09; 303/113.5; 303/DIG. 3; 303/DIG. 4; 303/166; 303/9.71; 303/9.63

(58) Field of Search ........................ 308/186, 113.5, 308/DIG. 3, DIG. 4, 166, 167, 9.71; 701/71, 79, 74, 70; 303/122.03, 122.04, 122.05, 122.09, 122.1, 122.11, 174, 176, 199, 9.63, 9.62, 9.75; 188/349

(56) References Cited

U.S. PATENT DOCUMENTS

| | | | |
|---|---|---|---|
| 5,167,441 | * 12/1992 | Schonlau et al. | 303/113.5 |
| 5,558,415 | * 9/1996 | Buschmann et al. | 303/186 |
| 5,641,209 | * 6/1997 | Kushi et al. | 303/186 |
| 5,795,039 | * 8/1998 | Fennel et al. | 303/122.05 |
| 5,887,957 | * 3/1999 | Büttner et al. | 303/186 |
| 5,899,540 | * 5/1999 | Burgdorf et al. | 303/122.08 |
| 5,938,299 | * 8/1999 | Hara et al. | 303/186 |
| 6,009,366 | * 12/1999 | Burkhard et al. | |

FOREIGN PATENT DOCUMENTS

| | | |
|---|---|---|
| 42 24 971 | 2/1994 | (DE) . |
| 43 09 243 | 9/1994 | (DE) . |
| 44 14 980 | 11/1995 | (DE) . |
| 44 17 935 | 11/1995 | (DE) . |
| 392 815 | 10/1990 | (EP) . |
| 563 740 | 10/1993 | (EP) . |
| 2 544 268 | 10/1984 | (FR) . |
| WO93/00238 | 1/1993 | (WO) . |
| WO93/23263 | 11/1993 | (WO) . |

OTHER PUBLICATIONS

Search Report of the German Patent Office Relating to Parent German Patent Application 196 20 583.2.

* cited by examiner

Primary Examiner—Douglas C. Butler
(74) Attorney, Agent, or Firm—Rader, Fishman & Grauer PLLC

(57) ABSTRACT

A method of electronic brake force distribution is applied to contribute to vehicle stability even in the event of failure of the system that detects failure of the front-axle brake circuit (13) in a vehicle (1). The method involves initiating a pressure maintenance or pressure reduction phase only after the standards with respect to a minimum vehicle deceleration upon brake circuit failure are met. This way, it is ensured that the standards are observed, on the one hand, and locking of the rear wheels (6,7) before the front wheels (4,5) is prevented with great likelihood, on the other hand. Thus, electronic brake force distribution (EBD) is switched over to less sensitive criteria. This makes allowance for both possibilities in the event of a failure of a pressure switch (15), i.e., that the front-axle brake circuit (13) is intact or that it is defective.

6 Claims, 1 Drawing Sheet

ELECTRONIC BRAKING-FORCE-DISTRIBUTION METHOD

BACKGROUND OF THE INVENTION

The present invention relates to a method of electronic brake force distribution.

Electronic brake force distribution is used to prevent the rear wheels from locking prior to the front wheels. When needed, the brake pressure of the rear wheels is therefore maintained by corresponding switch actuation or even decreased in the further procedure to prevent still further increase of an increased brake slip, or to decrease the brake slip. Vehicles with a front-axle/rear-axle brake circuit allotment typically include a pressure switch in the front-axle brake circuit. The purpose of the switch is to prevent, upon brake circuit failure on the front axle, an electronic brake force distribution on the rear axle from allowing a too low deceleration of the vehicle during braking. This is because there is a standard which demands at least 30% vehicle deceleration upon failure of a brake circuit. As a rule, a pressure switch is closed in the absence of front-axle brake pressure. Electronic brake force distribution is then only possible when the pressure switch is open because this indicates a pressure increase in the front-axle brake circuit. Irrespective of the exact function of the pressure switch, electronic brake force distribution will be deactivated in any case when a defective front-axle brake circuit is identified.

However, monitoring the front-axle brake pressure is not possible when the pressure switch suffers from a malfunction. This means that the electronic controller in the vehicle does not know whether or not appropriate front-axle brake pressure is built up, i.e., whether or not electronic brake force distribution is possible. Either only the pressure switch could be defective and the front-axle brake circuit intact, or a so-called double failure could have occurred, meaning that the front-axle brake circuit has failed and the pressure switch is defective.

An object of the present invention is to provide a method of electronic brake force distribution which contributes to increasing the vehicle stability even when the pressure switch is defective.

SUMMARY OF THE INVENTION

This object is achieved in principle by rendering the electronic brake force distribution less sensitive. Activation of the electronic brake force distribution is only possible if the standards with respect to the minimum vehicle deceleration upon brake circuit failure are already met.

This may be the only criterion because normally one has to assume in such a deceleration anyway that the brake pedal has been applied. Thus, other activation criteria are not absolutely necessary.

However, it is also possible that other criteria are additionally interrogated, for example, the calculated brake slip on the rear wheels.

DETAILED DESCRIPTION OF A PREFERRED EMBODIMENT

Figure 1:
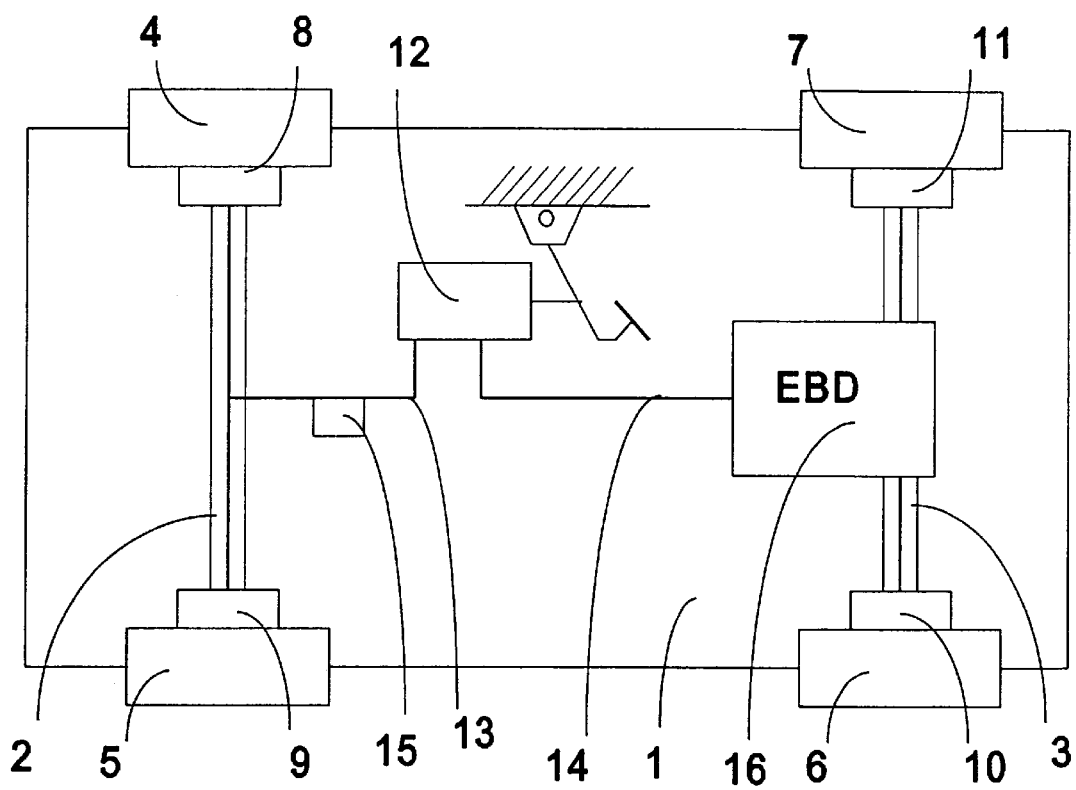
FIG. 1 shows, in a schematic view, a vehicle with EBD.

The vehicle 1 includes two axles 2,3, four wheels 4,5,6,7 with wheel brakes 8,9,10,11, a pedal-operated master cylinder 12 supplying a front-axle and a rear-axle brake circuit 13, 14, a pressure switch 15 in the front axle circuit 13 and an EBD unit 16 in the rear axle circuit 14.

A deceleration which is greater than 0.35 g, in particular 0.45 g, is preferred as a deceleration threshold which must be exceeded for the commencement of electronic brake force distribution in the event of a failure of the pressure switch 15 or the front axle brakes 8 and 9.

The exceeding of a deceleration threshold of 0.45 g can be chosen, for example, as the only criterion of activation of electronic brake force distribution, and a deceleration threshold of 0.35 g can be chosen as a threshold for the initiation of pressure increase pulses. Thus, the course of electronic brake force distribution is as follows. Regardless of a detected brake application, for example, by a brake light switch, electronic brake force distribution will always commence as soon as the vehicle deceleration is greater than 0.45 g. Initially, a pressure maintenance phase is introduced and, in an imminent locked condition, a pressure reduction phase. The control will continue until the vehicle 1 exhibits a lower vehicle deceleration.

The criteria to re-adapt the rear-axle brake pressure to the master cylinder brake pressure can either be those which apply to the commencement of electronic brake force distribution. However, lower deceleration thresholds may be employed as well.

A direct deactivation of electronic brake force distribution should be avoided because a sudden application of the rear-axle brakes 10,11 with the total brake pressure might result in locking of the rear-wheel brakes 10,11 under certain circumstances.

A most simple measure to adapt the rear-axle brake pressure to the master cylinder brake pressure is offered by a pressure increase phase with pressure increase pulses. When the deceleration becomes lower than 0.35 g, a pressure increase pulse pattern will be started which causes deactivation of the electronic brake force distribution as soon as the rear-axle brake pressure has been adapted to the prevailing master cylinder pressure.

This means, the inlet valves of the wheel brakes 10,11, accomodated in the EBD unit 16, are switched in pulsed operation, and a small brake pressure rise can be noted with each opening of the valve. Deactivation of the electronic brake force distribution will take place only subsequently, unless the activation criteria of electronic brake force distribution are satisfied simultaneously.

Either, it is only after deactivation possible to check whether the activation threshold for the electronic brake force distribution has been re-exceeded due to the increase of the rear-axle brake pressure. Or, alternatively, the deactivation will not occur until the activation criteria, after adaptation of the rear-axle brake pressure, have been examined and are not met.

What is claimed is:

1. A method of electronic brake force distribution on four-wheel, two-axle vehicles with a hydraulic brake system equipped with a pedal-operated brake pressure generator and a front-axle/rear-axle brake circuit allotment, which controls the rear-axle brake pressure with the objective of preventing the rear wheels from locking before the front wheels, wherein pressure maintenance, pressure reduction and pressure increase phases are provided, including the steps of:

upon recognizing the absence of a provision to determine a possible failure of the front-axle brake circuit;

checking whether the vehicle deceleration is larger than a predetermined minimum nominal deceleration that is set for situations with brake circuit failure, and, if it is, initiating an electronic brake force distribution.

2. A method as claimed in claim 1, including the step of checking further conditions, derived from the rotational behavior of the vehicle wheels, which have to be satisfied for an activation of electronic brake force distribution.

3. A method as claimed in claim 1, wherein the exceeding of a vehicle deceleration threshold of at least $Z_a = a*g$, with $a \geq 0.35$, is set as a necessary criterion for the activation of electronic brake force distribution.

4. A method as claimed in claim 1, including the step of adapting the rear-axle brake pressure to the pressure of the brake pressure generator at least when the vehicle deceleration becomes lower than $Z_b = b*g$, with $0.3 > b > a$.

5. Method as claimed in claim 4, wherein the step of adapting the pressure is performed by pressure increase phases with pressure increase pulses.

6. Method as claimed in claim 4, including the step of deactivating the electronic brake force distribution after the adaptation is made unless sufficient conditions for its activation are satisfied.

* * * * *